United States Patent
McGarvey (10) Patent No.: US 7,509,354 B2
(45) Date of Patent: Mar. 24, 2009

(54) SYSTEM, METHOD, AND COMPUTER PROGRAM PRODUCT FOR MULTI-MASTER REPLICATION CONFLICT RESOLUTION

(75) Inventor: John Ryan McGarvey, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 442 days.

(21) Appl. No.: 11/031,376

(22) Filed: Jan. 7, 2005

(65) Prior Publication Data
US 2006/0155945 A1 Jul. 13, 2006

(51) Int. Cl.
G06F 17/30 (2006.01)
(52) U.S. Cl. .................. 707/203; 707/10; 707/101; 707/201; 711/159; 711/160; 711/161; 711/162; 709/208; 709/220; 709/223
(58) Field of Classification Search .................. 711/162, 711/159, 141; 707/201, 133
See application file for complete search history.

(56) References Cited

U.S. PATENT DOCUMENTS

| | | | | |
|---|---|---|---|---|
| 5,440,727 A * | 8/1995 | Bhide et al. | ................. | 711/117 |
| 5,603,024 A | 2/1997 | Goldring | .................... | 395/619 |
| 5,787,262 A * | 7/1998 | Shakib et al. | ............... | 709/205 |
| 5,806,074 A | 9/1998 | Souder et al. | ................ | 707/201 |
| 6,058,401 A | 5/2000 | Stamos et al. | ................ | 707/201 |
| 6,098,078 A * | 8/2000 | Gehani et al. | ................ | 707/203 |
| 6,125,371 A | 9/2000 | Bohannon et al. | ........... | 707/203 |
| 6,223,187 B1 * | 4/2001 | Boothby et al. | ............. | 707/201 |
| 6,581,075 B1 | 6/2003 | Guturu et al. | ................ | 707/201 |
| 6,615,223 B1 | 9/2003 | Shih et al. | .................... | 707/201 |
| 6,691,245 B1 * | 2/2004 | DeKoning | ..................... | 714/6 |
| 6,694,337 B1 * | 2/2004 | King et al. | .................. | 707/201 |
| 7,162,499 B2 * | 1/2007 | Lees et al. | .................. | 707/203 |
| 2002/0087501 A1 | 7/2002 | Breitbart et al. | ................ | 707/1 |

* cited by examiner

Primary Examiner—Hyung S Sough
Assistant Examiner—Kaushikkumar Patel
(74) Attorney, Agent, or Firm—Yee & Associates, P.C.; Robert Straight (57) ABSTRACT

A method, computer program product, and a data processing system for performing data replication in a multi-mastered system is provided. A first data processing system receives a replication command generated by a second data processing system. A conflict is identified between a first entry maintained by the first data processing system and a second entry of the second data processing system. Responsive to identifying the conflict, a one of the first entry and the second entry is determined to be a most recently modified entry and a remaining entry of the first and second entries is determined to be a least recently modified entry. The least recently modified entry is replaced with the most recently modified entry, and the least recently modified entry is logged.

2 Claims, 7 Drawing Sheets

SYSTEM, METHOD, AND COMPUTER PROGRAM PRODUCT FOR MULTI-MASTER REPLICATION CONFLICT RESOLUTION

BACKGROUND OF THE INVENTION

1. Technical Field

The present invention relates generally to an improved data processing system and in particular to a method and apparatus for resolving a replication conflict in a multi-mastered data processing system. Still more particularly, the present invention provides a method and apparatus for resolving a replication conflict between multiple data masters in a data processing system in a manner that preserves data that is replaced during a replication conflict resolution operation.

2. Description of Related Art

In many data processing system environments, client applications must have uninterrupted read and write access to a directory data service. In such environments, it is advantageous if no single point of failure or network link outage may cause a loss of data access. To facilitate such data access, databases and other data stores are often replicated such that multiple data server replicas are accessible by clients. Replicas may be read-only or read-write. Read-write replicas are called masters. Multiple masters are frequently used to facilitate write access to the data that is not interrupted by any single point of failure. When a change to a data set, such as an entry of a database, is made on one master, the change is replicated at other masters so that the data of the masters is convergent.

However, changes to entries of the data store may occur at multiple separate machines concurrently. As the resulting data is replicated, the content of servers may diverge, creating problems. Data stores in a multi-mastered data system should provide an authoritative and consistent view of the data, but as the content of the multiple servers diverges, it may not be possible to determine which version of the data is authoritative, or even to guarantee the internal consistency of the data on any server.

Various approaches have been attempted to address divergence of replicated data. For example, the IETF LDUP working group has attempted to resolve this problem but the approach defined by that group involves considerable overhead, does not provide for data convergence in some cases, and may produce records that are not schema compliant.

Thus, it would be advantageous to provide an efficient technique for resolving a replication conflict in a multi-mastered data processing system. It would be further advantageous to provide a technique for resolving a replication conflict between multiple data masters in a data processing system while preserving data that is replaced during a replication conflict resolution operation.

BRIEF SUMMARY OF THE INVENTION

The present invention provides a method, computer program product, and a data processing system for performing data replication in a multi-mastered system. A first data processing system receives a replication command generated by a second data processing system. A reliable and efficient means is defined to identify conflicts between a first entry maintained by the first data processing system and a second entry of the second data processing system. Responsive to identifying the conflict, a one of the first entry and the second entry is determined to be a most recently modified entry and the remaining entry of the first and second entries is determined to be a least recently modified entry. The least recently modified entry is replaced with the most recently modified entry, and the least recently modified entry is logged.

BRIEF DESCRIPTION OF THE SEVERAL VIEWS DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
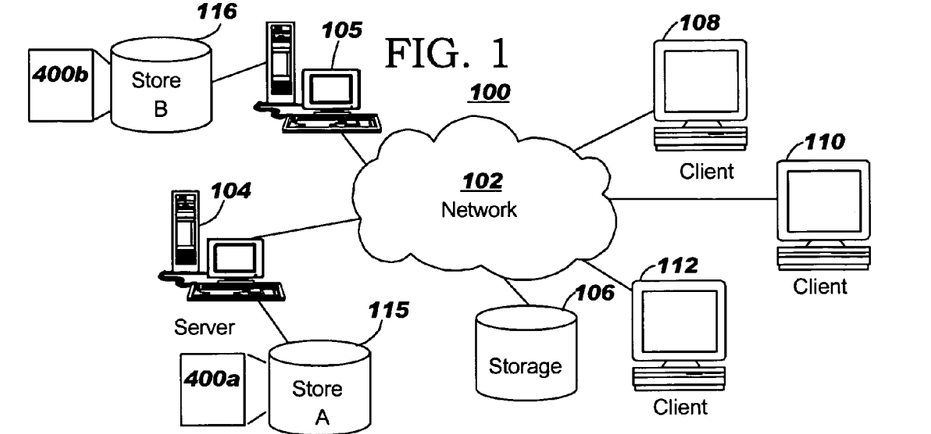
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 104 and 105 are connected to network 102 along with storage unit 106. Each server 104 and 105 respectively host, or interconnect with, data stores 115 and 116. In the illustrative examples, data stores 115 and 116 are representative of data masters that are to store replicated data.

In addition, clients 108, 110, and 112 are connected to network 102. These clients 108, 110, and 112 may be, for example, personal computers or network computers. In the depicted example, servers 104 and 105 provide data, such as LDAP directories, to clients 108-112. Clients 108, 110, and 112 are clients to servers 104 and 105. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

In some situations, writes may occur on multiple masters prior to a replication operation being performed between the masters. For example, client 112 may perform a write to data store 115 and client 108 may perform a write on data store 116 prior to a replication operation being performed between data store 115 and 116. This may happen, for example, if a WAN link or other communication medium between data stores 115 and 116 is down and if clients 108 and 112 continue to perform writes during this period. As long as the writes performed by clients 115 and 116 involve disjoint entries, data stores 115 and 116 are synchronized once the link between servers 104 and 105 is brought back up. However, if a write occurs for a given entry on a first master and, prior to the write being replicated on a second master, a write to the corresponding entry on the second master will result in a replication conflict. Mechanisms of the present invention provide a replication conflict resolution as described more fully hereinbelow.

Figure 2:
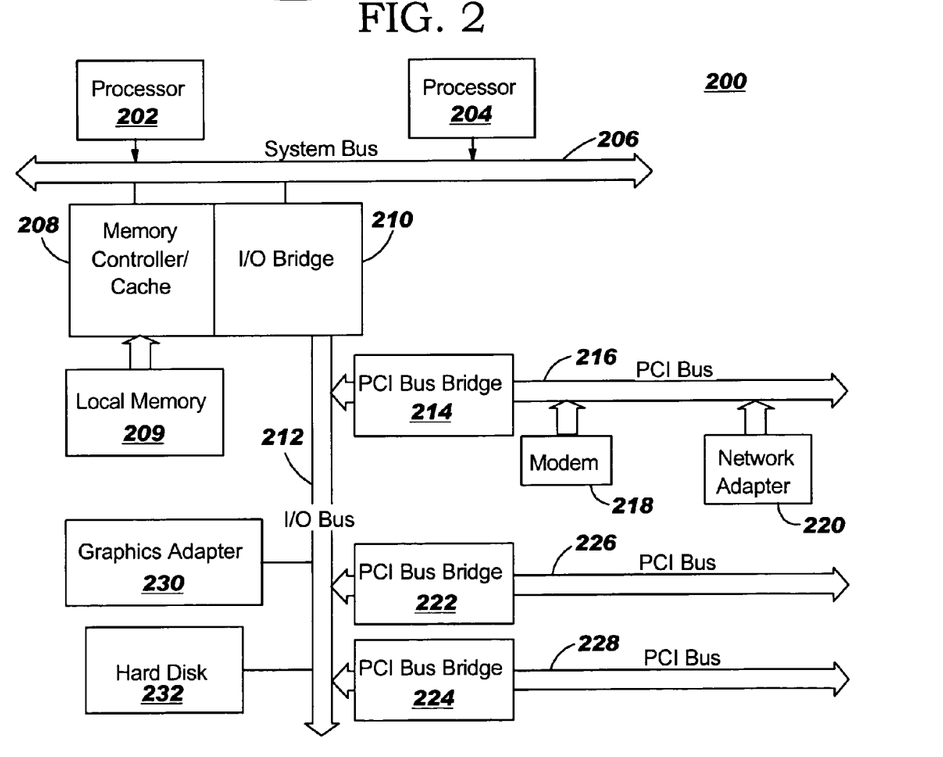
FIG. 2 is a block diagram of a data processing system that may be implemented as a server depicted in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
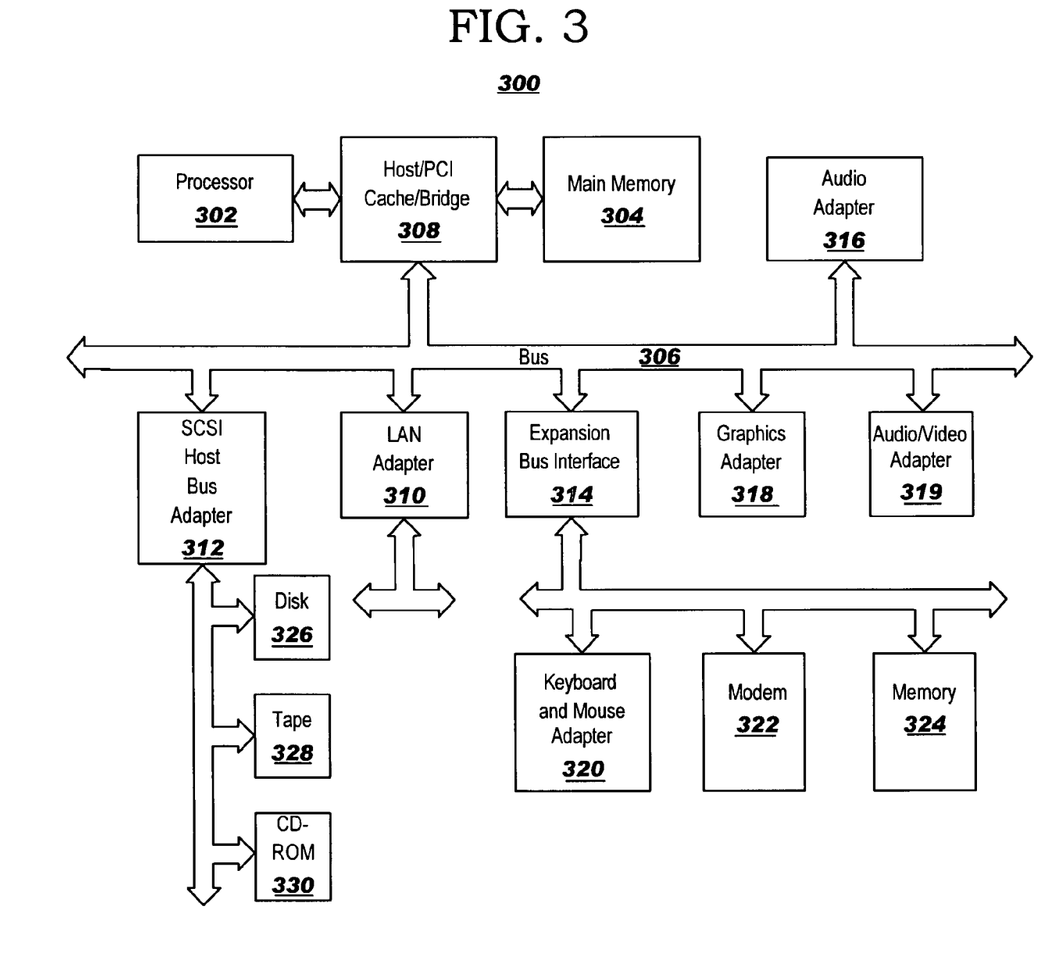
FIG. 3 is a block diagram illustrating a data processing system depicted in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4A:
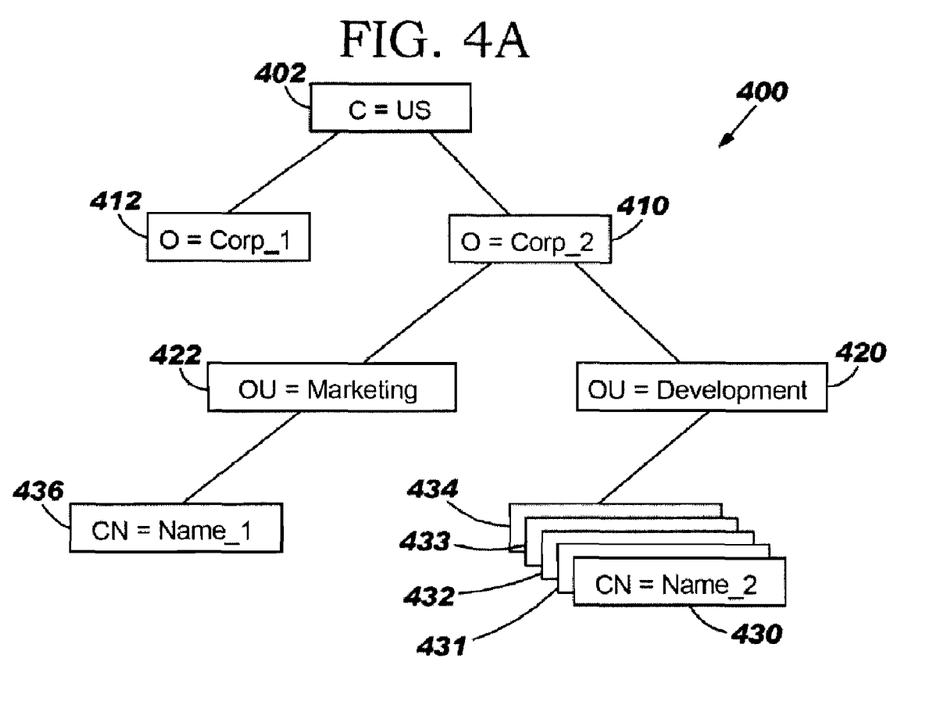
FIG. 4A is a diagrammatic illustration of a data source instance that may be replicated in accordance with a preferred embodiment of the present invention.

FIG. 4A is a diagrammatic illustration of a data store instance that may be replicated in accordance with a preferred embodiment of the present invention. In the diagrammatic illustration of FIG. 4, a data source 400 comprises a directory data structure, e.g., a lightweight directory access protocol (LDAP) directory, formatted according to the X.500 ITU-T standard. While a preferred embodiment of the present invention is described in relation with data formatted according to the X.500 standard, depictions and descriptions are provided only for illustrative purposes to facilitate an understanding of the invention. Other data formats, such as relational databases, tabular data, or any other structured data format, may be suitably substituted for those shown without departing from the teachings of the present invention.

Data source 400 may be stored on disk drive 226, fetched therefrom by processor 202, and processed by data processing system 200 shown in FIG. 2. In the examples provided herein, data source 400 comprises a data master instance that is replicated within a network system, e.g., network data processing system 100 shown in FIG. 1. To facilitate an understanding of the invention, assume an instance (illustratively designated data source 400a) of data source 400 is maintained in data store 115 managed by server 104 and another instance (illustratively designated data source 400b) of data source 400 is stored in data store 116 managed by server 105.

Data source 400 comprises a plurality of entries related hierarchically to one another in a directory information tree (DIT). In the illustrative example, data source 400 comprises a root entry 402 that has no superior entries, various non-leaf entries 410-422 that each have both superior and subordinate entries, and leaf entries 430-436 that have no subordinate entries but each have a superior entry. Each entry has a name and a list of one or more attributes. Each attribute may have one or more corresponding value or may be null. Each entry has a name of arbitrary length, often referred to as a relative distinguished name (RDN). A distinguished name is derived or defined for each entry, for example, according to distinguished name definitions as defined by IETF Requests for Comment 2251 and 2253. For example, entry 430 has a name of {CN=Name_2}. Each non-root entry's name is appended to its parent distinguished name in a hierarchical manner to form a distinguished name that distinguishes the entry from all other entries in the data source. For example, the name of entry 430 is appended with the distinguished name of parent entry 420. Thus, the distinguished name of entry 430 is {C=US, O=Corp_2, OU=Development, CN=Name_2}.

Each entry has a required attribute called objectclass. The objectclass of the attribute defines the other attributes of the entry, which are required, and which are optional. Attributes may be single or multi-valued. The objectclass attribute itself may be multi-valued, so that additional attributes can be added to the entry at any time. Attributes may be created or deleted, and attribute values may be added, removed, or modified. Directory entries are of arbitrary size, some being a hundred thousand bytes or more. Entry names are guaranteed to be unique within the directory.

Figure 4B:
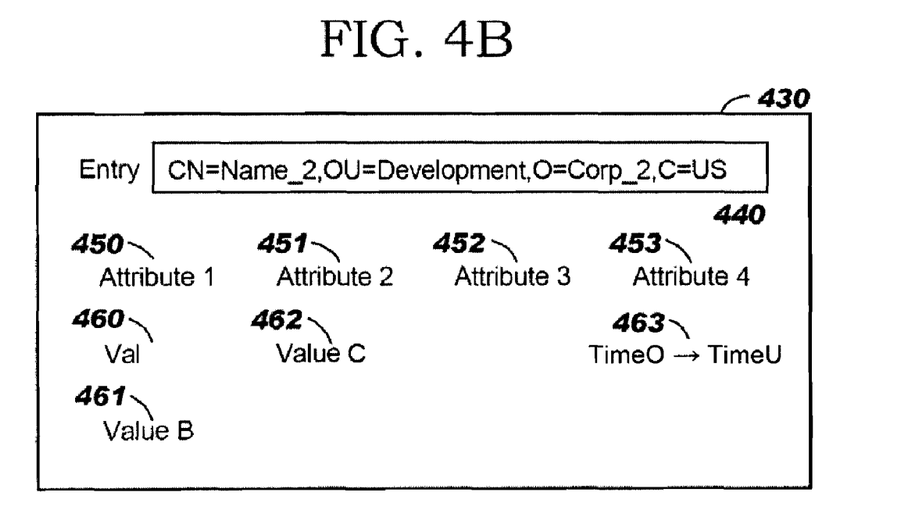
FIG. 4B is a diagrammatic illustration of an entry of data source 400 shown in FIG. 4A in accordance with a preferred embodiment of the present invention.

FIG. 4B is a diagrammatic illustration of an entry of data source 400 shown in FIG. 4A in accordance with a preferred embodiment of the present invention. Entry 430 comprises a distinguished name 440. As described above, the distinguished name is derived from the parental entries of the entry. In the illustrative example, entry 430 has distinguished name 440 of {C=US, O=Corp_2, OU=Development, CN=Name_2}. Entry 430 has attributes 450-453 that may have one or more values assigned thereto. In the illustrative example, attribute 450 (Attribute 1) has values 460 and 461 of ValueA and ValueB, respectively, attribute 451 (Attribute 2) has a value of ValueC, and Attribute 453 (Attribute 4) has an original value of Time0. Attribute 452 (Attribute 3) has no value assigned thereto. In the illustrative example, attribute 4 is assigned a timestamp value 463 that indicates the creation time, or the latest modification to, entry 430. For example, timestamp value Time0 assigned to attribute 453 defines a time at which entry 430 was written (original timestamp), and timestamp value TimeU defines a time at which entry 430 was modified (updated timestamp).

Preferably, entry timestamps are to provide certain timestamp characteristics. Particularly, timestamps are assigned to entries in response to entries being created or changed and are generated in strictly increasing time values in a manner such that no two entries can have the same timestamp. Various mechanisms for generation of timestamps having unique values are known in the art. Additionally, a timestamp preferably contains a bit field identifying the master where the change or creation originated. This provides a mechanism for guaranteeing that changes occurring on separate servers can never have the same timestamp. In particular, if corresponding entries are modified on different masters, each master will store a different timestamp with the respective entry. Additionally, when a change is replicated, the timestamp is also replicated. Finally, the system clocks of the replica servers must be roughly synchronized, differing by no more than a few seconds, and this rough synchronization must be reflected in the timestamps. This synchronization can be achieved using a network time service, as is well known to practitioners of the art.

Returning again to FIG. 1, two instances of data source 400 are deployed in network data processing system 100. Data sources 400a and 400b are examples of multiple masters each comprising an instance of the data structure of data source 400 shown in FIG. 4A. As referred to in the examples below, entries of the data source instance maintained in data store 115 are designated with an "a" appended to the entry reference numeral, and entries of the data source instance maintained in data store 116 are designated with a "b" appended to the entry reference numeral. Thus, for example, entry 430a refers to the instance of entry 430 in the data source 400a instance maintained on store 115, and entry 430b refers to the corresponding instance of entry 430 in data source 400b instance maintained on store 116. In the illustrative example, data source 400a is maintained on store 115 accessed via server 104, and data source 400b is maintained by store 116 accessed via server 105. When data sources 400a and 400b are synchronized, respective data contained therein are replicates of one another and the data of data sources 400a and 400b are said to be convergent.

When a modification is made to one master, an attempt is later made to replicate the change to other masters within the system. For example, assume client 112 performs a write to entry 430a of data source 400a in store 115 that modifies an attribute value element, e.g., a modification to value 460a of attribute 450a. When the modify operation is performed on entry 430a, the timestamp data element of attribute 453a in the modified entry is changed to indicate the time the change was made. Pursuant to maintaining data convergence among the masters, server 104 will attempt to replicate the change to the corresponding entry in data source 400b maintained on store 116. For example, server 104 may send an update message that contains the timestamp read from entry 430a prior to the modification operation on the entry, the updated timestamp that was written to the entry at the time the modification was performed, and a descriptor of the change, for example the new value of the modified attribute.

When changes are made to corresponding records of multiple masters prior to one of the masters replicating the change with the other master, a replication conflict may arise. A replication routine implemented according to the present invention identifies a replication conflict and resolves the conflict such that data convergence is obtained between the multiple masters.

The present invention provides a mechanism to ensure that when a replication conflict occurs, the data stored in the given entry converges all masters to a single version, which corresponds to the most recently modified version of the entry. Conventional mechanisms for obtaining a convergent end state is achieved by replicating the entire updated entry whenever a change occurs. The replicated entry is replaced with the entry on the target server if the timestamp of the replicated entry is newer than the timestamp on the target server. However, such an approach requires that the entire entry be replicated with each change. Typically, the amount of data associated with a change is much smaller than then entry. For replication to be efficient, it is preferable to replicate only the change rather than the entire updated entry. For this reason, data replication solutions typically propagate only the changes. For example, replication of LDAP directory data only propagates changed data and not the entire entry.

Replication conflicts may occur as follows. Suppose a given directory service has two masters, M1 and M2. Suppose that M1 and M2 have an entry with distinguished name cn=E1, and that it has an attribute called "color" with value "white" and an attribute called "count" with value "one". The entry has a last modified timestamp of t0. At time t1, the attribute value is modified on master M1. Attribute value "white" is changed to "green" and "one" is changed to "two". At time t2, and before this change is replicated to master M2, the attribute value "white" is modified to "blue" on M2. Suppose that, when the change with timestamp t1 reaches M2, the server applies the change. In this case, on M2, the entry will end up with timestamp t1, a color of "green", and count of "two". Then the change with timestamp t2 reaches M1 and is applied at M1. The entry on M1 ends up with timestamp t2, a color of "blue", and a count of "two". Suppose, on the other hand, that when the change with timestamp t1 reaches M2, the M2 server rejects the change because t1 is less than t2. In this case, the entry on M2 ends up with timestamp t2, a color of "blue", and a count of "one". In neither case does the entry converge to a common set of values. This invention remedies the problem, by: (a) augmenting the data that flows with the change to include an additional timestamp; and (b) providing an algorithm for use of all three timestamps data to ensure convergence.

Figure 5:
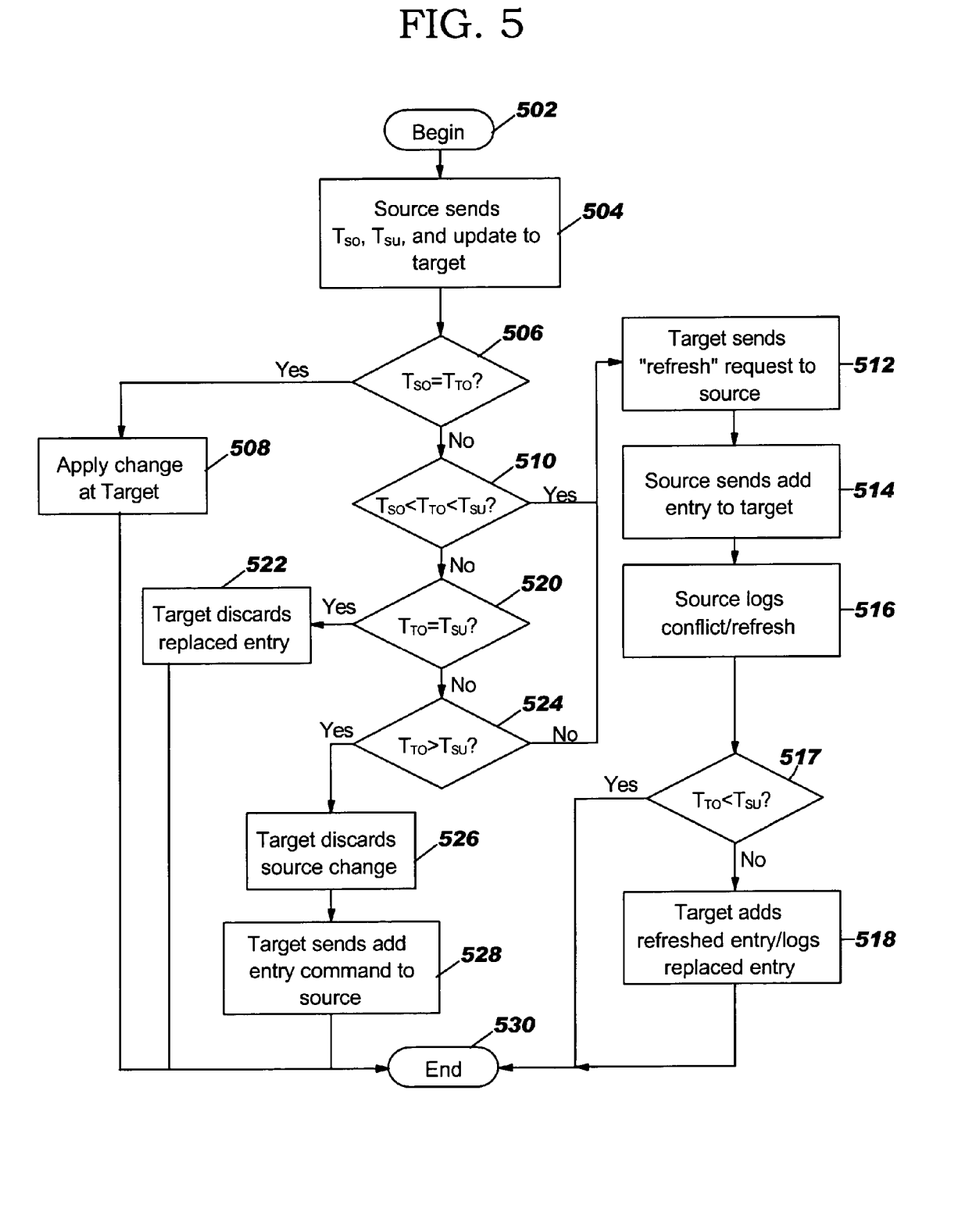
FIG. 5 is a flowchart of a replication routine performed in accordance with a preferred embodiment of the present invention.

FIG. 5 is a flowchart of a replication routine performed in accordance with a preferred embodiment of the present invention. The routine in initialized (step 502), for example upon modification of an entry of a data source, and the source sends an original source timestamp (Tso), an updated source timestamp (Tsu) and the update to the target (step 504). As referred to herein, an original source timestamp, Tso, is a timestamp of an entry prior to a modification of the entry, and an updated source timestamp, Tsu, is a timestamp of a modified entry after the revision is made to the entry. Additionally, as referred to herein, a source is a data source at which a modification is made to an entry of an instance of a data master, and a target is a data source at which the modification is to be replicated on another corresponding instance of the master. On receipt at the target of Tso, Tsu and the update, the target compares the original source timestamp with the original target timestamp (TTo) of the entry located at the target corresponding to the modified entry of the source (step 506). As referred to herein, an original target timestamp is the timestamp of an entry of an instance of the master at the target at which a replication is being performed. That is, the original target timestamp is the timestamp of an entry corresponding to the entry that was modified at the source. If the original source timestamp equals the original target timestamp thus indicating no replication conflicts exist between the source and the target, the change is applied at the target (step 508). Accordingly, when the change (timestamped Tsu) is applied at the target, convergence of the corresponding entries on the source and the target is achieved. Accordingly, the entry on the target matches the state of the entry on the source, and the replication routine may then exit (step 530). Replication conflicts are likely only for a small percentage of the update operations, so this is the most common case.

Returning again to step 506, if the original source timestamp does not equal the original target timestamp thus indicating that a replication conflict has occurred, a comparison of the source original timestamp, the target original timestamp and the source updated timestamp is made (step 510). Particularly, a comparison of the source original, source updated, and target original timestamps are made to determine if the target original timestamp is both greater than the source original timestamp and less than the source updated timestamp. If the target original timestamp is both greater than the source original timestamp and less than the source updated timestamp thus indicating that the source has the most recent version of the entry, the target returns a request for a "refresh" to be performed on the target by the source (step 512). On receipt of the refresh request, the source sends an Add command for the entire modified entry to the target (step 514), and generates a log record of the conflict between the source and target as well as a record of the refresh operation performed (step 516). On receipt of the add command, the target once again compares timestamps to determine if a change has occurred to the entry with a timestamp later than the refreshed record (step 517). Particularly, the target original timestamp is compared with the source updated timestamp. If the target original timestamp is less than the source updated timestamp, the add of the refreshed entry is rejected, and the replication routine exits according to step 530. If the target original timestamp is determined to be greater than the source updated timestamp at step 517, the target removes the corresponding entry from the data store at the target, adds the source updated entry to the target data store, and logs the replaced entry (step 518). The replication routine then exits according to step 530.

Returning again to step 510, if the target original timestamp is not both greater than the source original timestamp and less than the source updated timestamp, a comparison of the target original timestamp and the source updated timestamp is made (step 520). In the event that the target original timestamp is determined to be equal to the source updated timestamp thus indicating that the target entry has already been updated, the replicated change is discarded at the target (step 522). Such a scenario may arise if, for example, the change had previously been sent to the target but a communication error prevented the target from acknowledging that the change had been applied. The replication routine may then proceed to exit according to step 530.

Returning again to step 520, in the event that the target original timestamp does not equal the source updated timestamp, a comparison of the target original timestamp and the source updated timestamp is made to determine if the target original timestamp is greater than the source updated timestamp (step 524). In the event that the target original timestamp is determined to be greater than the source updated timestamp thus indicating that the target has the most recent version of the entry, the target discards the entry change conveyed to the target by the source (step 526).

Convergence is achieved in this case by having the target initiate a replication with the source (step 528). That is, the general procedure described in FIG. 5 is now performed with the original "Target" acting as the replication Source, and vice versa, as follows. In replication topologies, a given change, such as the one associated with the target original timestamp Tto, must be replicated to each of the machines in the topology. Replication sessions are occurring in parallel between various source and target machines, and there is no interdependence or time synchronization between these parallel sessions. The same algorithm is then applied, with the roles of source and target machines reversed, so that the "Source" is now Target1, and the "Target" is now Source1. The change associated with the target original timestamp Tto is sent by Source1 as a change Tso1, Tsu1, where Tsu1=Tto and Tso1 is the timestamp of the entry before the change was applied. At Target1, the entry has timestamp Tto1=Tsu. As the original Target rejected the change timestamped with the source updated timestamp Tsu, is assured that the target original timestamp is less than the source updated timestamp, that is that Tto1<Tsu1. If the source original timestamp Tso1 is equal to the target original timestamp Tto1, the change is applied, as in step 508. If the source original timestamp Tso1 does not equal the target original timestamp Tto1, the target rejects the change and requests an update of the entire entry, as in step 516 and 518.

Returning again to step 524, in the event that the target original timestamp is not greater than the source updated timestamp thus indicating that the source original timestamp is greater than the target original timestamp, a replication conflict is identified and the replication routine proceeds to execute a refresh procedure for refreshing the target entry by conveying a refresh request from the target to the source according to step 512.

If a given entry is being changed continuously on several masters over an interval, convergence may not occur until write activity for that entry stops. Changes will be replicated in both directions and each side may reject changes and refreshes sent by the other, using the timestamp logic herein described. However, if write activity stops on either of the masters for a long enough interval, the procedure herein described will result in convergence.

Figure 6:
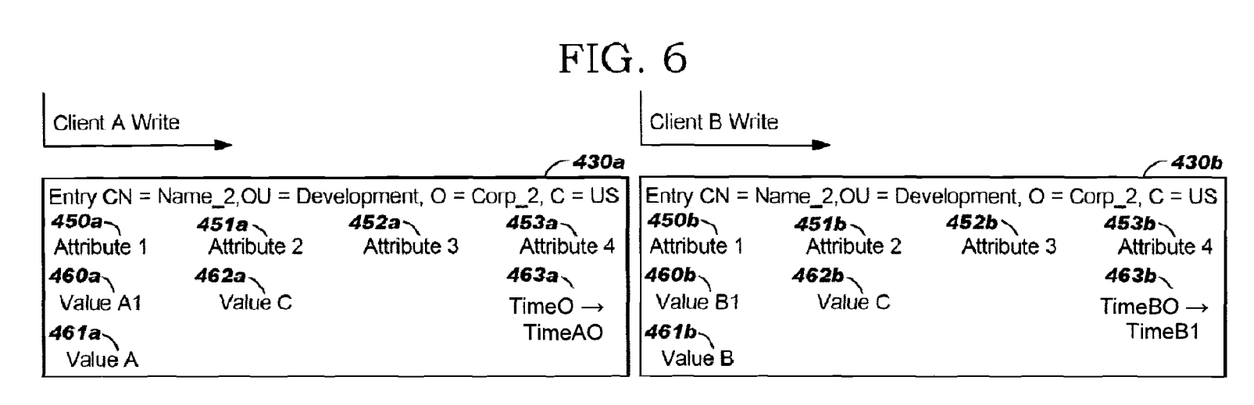
FIG. 6 is a diagrammatic illustration of client writes to corresponding entries of respective masters that results in a replication conflict and replication resolution in accordance with a preferred embodiment of the present invention.

FIG. 6 is a diagrammatic illustration of client writes to corresponding entries of respective masters that results in a replication conflict and replication resolution in accordance with a preferred embodiment of the present invention. In the illustrative example, a client (client A) performs a modification of entry 430a of a first master and another client (client B) performs a modification of a corresponding entry 430b of a second master prior to either of the masters performing a replication with one another. In the illustrative example, assume that entry 430a is an entry of data source 400a and is maintained by server 104, and that entry 430b is a corresponding entry in data source 400b and is maintained by server 105. In the present example, client A has modified the attribute value 460a of attribute 450a by writing a text data element "ValueA1" to entry 430a. When the entry modification is performed, the previous (original) timestamp value is read from the timestamp field (e.g., attribute 453) and is replaced with a timestamp value that indicates the time of the change to entry 430a. In the illustrative example, the previous (original) timestamp value read from the timestamp field is "Time0", and the new (updated) timestamp value written to attribute value 463a responsive to the entry modification performed by client A is "TimeA0". In a similar manner, client B has modified the attribute value 460b of attribute 450b by writing a text data element "ValueB1" to entry 430b. When the entry modification is performed, the previous (original) timestamp value is read from attribute 453b and the value of attribute 453b is replaced with a timestamp that indicates the time of the change to entry 430b. In the illustrative example, the previous (original) timestamp value "TimeB0" is changed to the new (updated) timestamp value "Time B1" which is written to entry 430b responsive to the record modification performed by client B. Because a replication procedure was not performed intermediate the two modifications performed by clients A and B, the data maintained in entries 430a and 430b is now non-convergent. Particularly, attribute value 460a of entry 430a does not correspond with attribute value 460b of corresponding entry 430b.

Assume for illustrative purposes that server 104 maintaining the entry modified by client A initiates a replication procedure with server 105 maintaining the corresponding entry modified by client B. Thus, server 104 functions as the replication source and server 105 functions as the replication target in the present example. Further assume that the entry modification performed by client A was performed after the entry modification performed by client B and that the time recorded by the timestamp of attribute value 463a prior to the modification by client A does not equal the time recorded by the timestamp of the modification by client B of the corresponding entry. That is, assume that TimeA0 (the source updated timestamp) is greater than TimeB0 (the target original timestamp in the present replication scenario), and Time0 (the source original timestamp) does not equal TimeB0. Accordingly, server 104 communicates the source original timestamp (Time0), the source updated timestamp (TimeA0), and the entry modification to server 105 in a replication message in accordance with step 504 described in FIG. 5. The entry modification may comprise, for example, an identification of the modified attribute and the modified attribute value of the modified entry. For example, in the present example, the entry modification would comprise an identification of the modified attribute 450a and a specification of the modified attribute value 460a (ValueA1). On receipt of the replication message, server 105 determines that a replication conflict exists by evaluating the source original timestamp (Time0) as unequal to the target original timestamp (TimeB0). Target server 105 then determines that source server 104 has the most updated version of the entry by identifying the source original timestamp as less than the target original timestamp and further identifying the target original timestamp as less than the source updated timestamp in accordance with step 510 described in FIG. 5. Target server 105 then sends a refresh request to source server 104 in accordance with step 512 of FIG. 5. Source server 104 sends an add entry command to target server 105 responsive to receipt of the refresh request in accordance with step 514 of FIG. 5. The add entry command may comprise, for example, an insert command including the entire entry 430a as recorded on source server 104. Preferably, source server 104 logs the replication conflict and the refresh operation in accordance with step 516 of FIG. 5. The log entry of the replication conflict may include an identity of the entry identified as having the replication conflict, an identity of the target server with which the replication conflict was observed, or other information that may facilitate later administrative intervention by systems personnel.

On receipt of the add entry command, target server 105 replaces the entry identified to have the replication conflict by inserting the refreshed entry (entry 430*a*) provided by source server 104 into data source 430*b* and logging the replaced entry.

Figure 7:
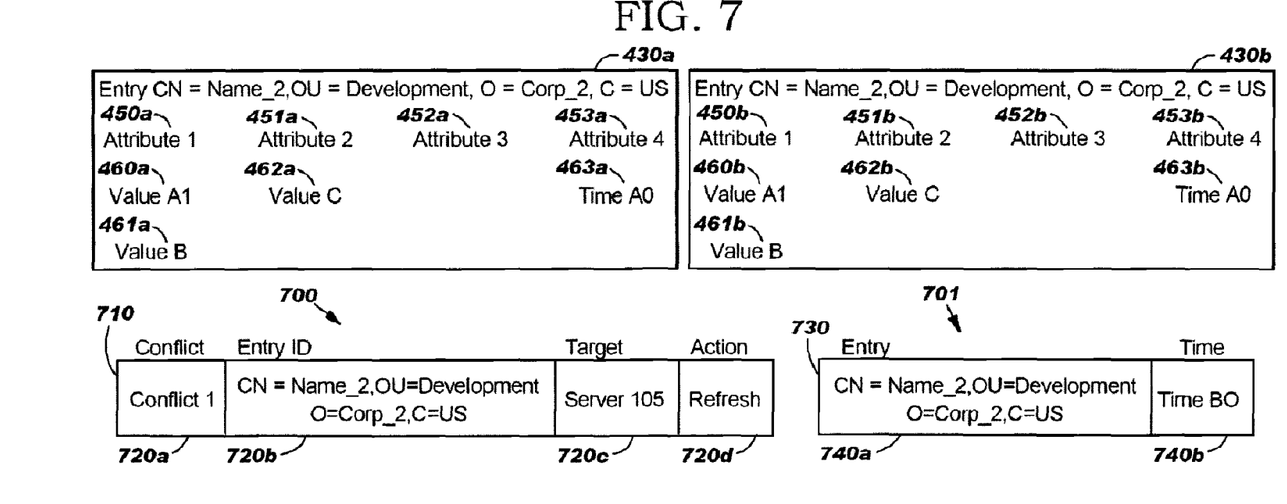
FIG. 7 is a diagrammatic illustration of entries of masters described in FIG. 6 after processing of the entries by the replication routine implemented in accordance with a preferred embodiment of the present invention.

FIG. 7 is a diagrammatic illustration of entries of masters described above in FIG. 6 after processing of the entries by the replication routine implemented in accordance with a preferred embodiment of the present invention. Each of entries 430*a* and 430*b* comprise convergent data. Particularly, both entries 430*a* and 430*b* include modified data originally written to entry 430*a* by client A, and each entry 430*a* and 430*b* include the timestamp TimeA0 that identifies the time that the entry modification was performed by client A.

Additionally, log 700 maintained by server 104 includes a record that defines the replication conflict that was resolved. In the illustrative example, record 710 includes a conflict identifier (Conflict1) in conflict field 720*a*. The record includes an identifier that specifies what entry of the master was involved in the conflict. In the illustrative example, entryID field 720*b* includes a data element, e.g., the distinguished name of entry 430*a*, that identifies the entry involved in the conflict. Additionally, the target server involved in the conflict with the source server is identified by a data element in target field 720*c*. For example, the data element specifying server 105 in target field 720*c* may comprise a network address of server 105 maintaining the master involved in the conflict. Action field 720*d* records the action taken to resolve the conflict. In the present example, the source server associated with log 700 performed a refresh with the conflicting target server and a data element of "Refresh" is assigned to field 720*d* in log 700 to indicate the conflict resolution action taken by the source server.

Additionally, target server 105 records the entry that was replaced by the refresh procedure. In the preset example, target server 105 has recorded in record 730 of log 701*a* record of the entry that was replaced in the replication routine. In the present example, entry 430*b* is stored in field 740*a* and the timestamp data element value of entry 430*b* that was maintained by server 105 prior to the refresh operation is stored in field 740*b* of record 730. Thus, log 701 provides an archive of replaced data that may be manually or otherwise retrieved at a later time thereby preventing data loss resulting from the replication procedure.

A similar procedure would be performed in the reverse direction if the target original timestamp were to be identified as greater than the source updated timestamp. For example, assume that source server 104 had initiated a replication procedure after client A and client B had performed the write operations shown above in FIG. 6. However, assume that target server 105 determines that a replication conflict exists and that the target original timestamp is grater than the source updated timestamp, that is TB0 is greater than TA0. In this instance, target server 105 has the most updated version of the modified entry and thus discards the update supplied by server 104 in accordance with step 526 in FIG. 5 and sends an add entry command to source server 104. Server 104 would then add the entry provided by server 105 and log the replaced entry corresponding to the added entry. Server 105 would generate a log of the conflict similar to log 700 generated by server 104 described in FIG. 7.

Figure 8:
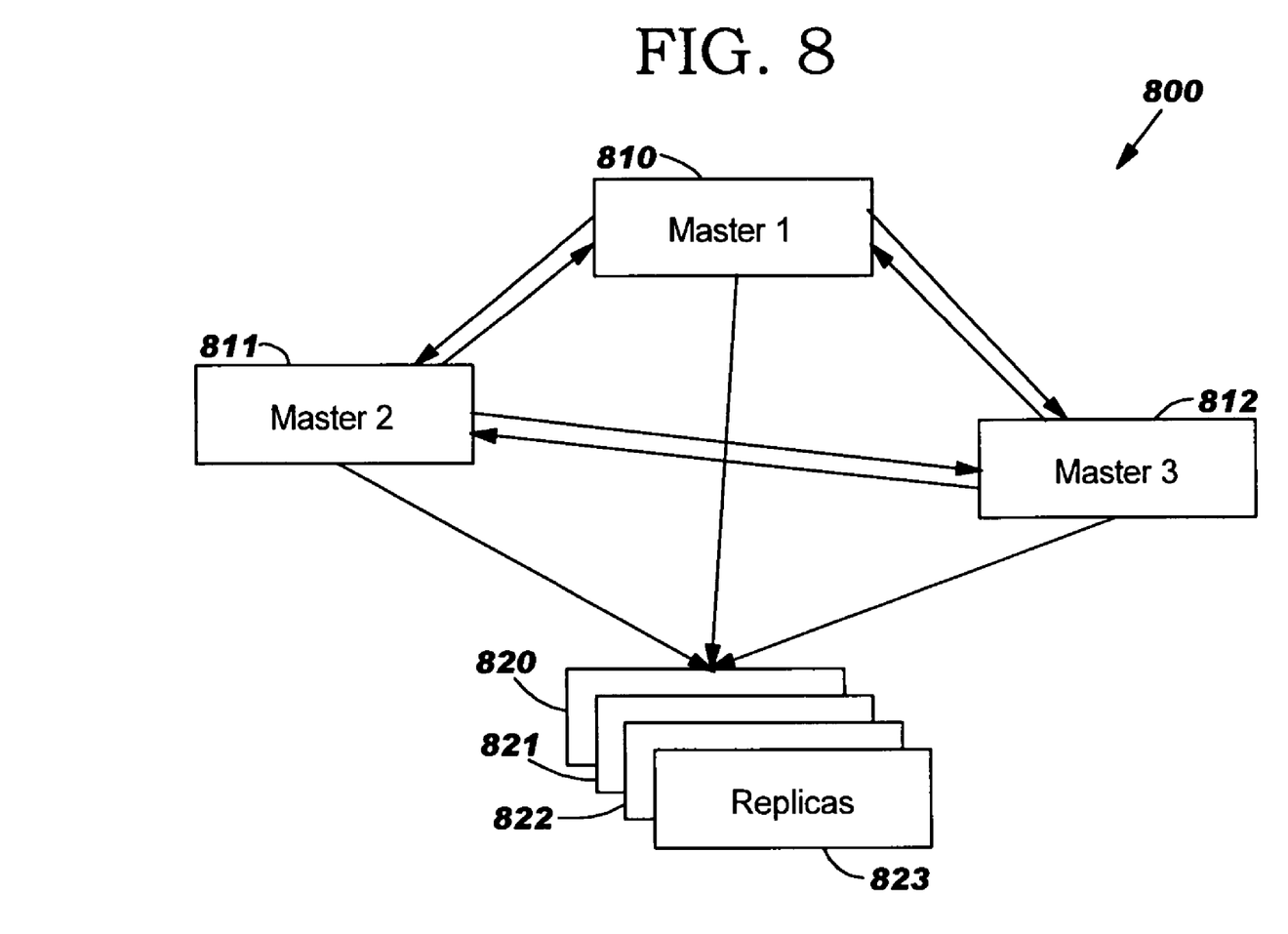
FIG. 8 shows a topology in which three or more masters of a single data source and several read only replicas are deployed within a network in accordance with another embodiment of the present invention.

The examples shown above involve two masters although embodiments of the invention are not limited to any implementations of a particular number of masters, and the invention applies to other replication topologies. For example, FIG. 8 shows a topology in which three or more masters 810-812 of a single data source and several read only replicas 820-823 are deployed within a network 800 in accordance with another embodiment of the present invention. Each master 810-812 may replicate changes originating on that master to all of the other machines in the topology as shown in FIG. 8. For example, a change originating on master 810 may be replicated by master 810 to other masters 811 and 812.

Figure 9:
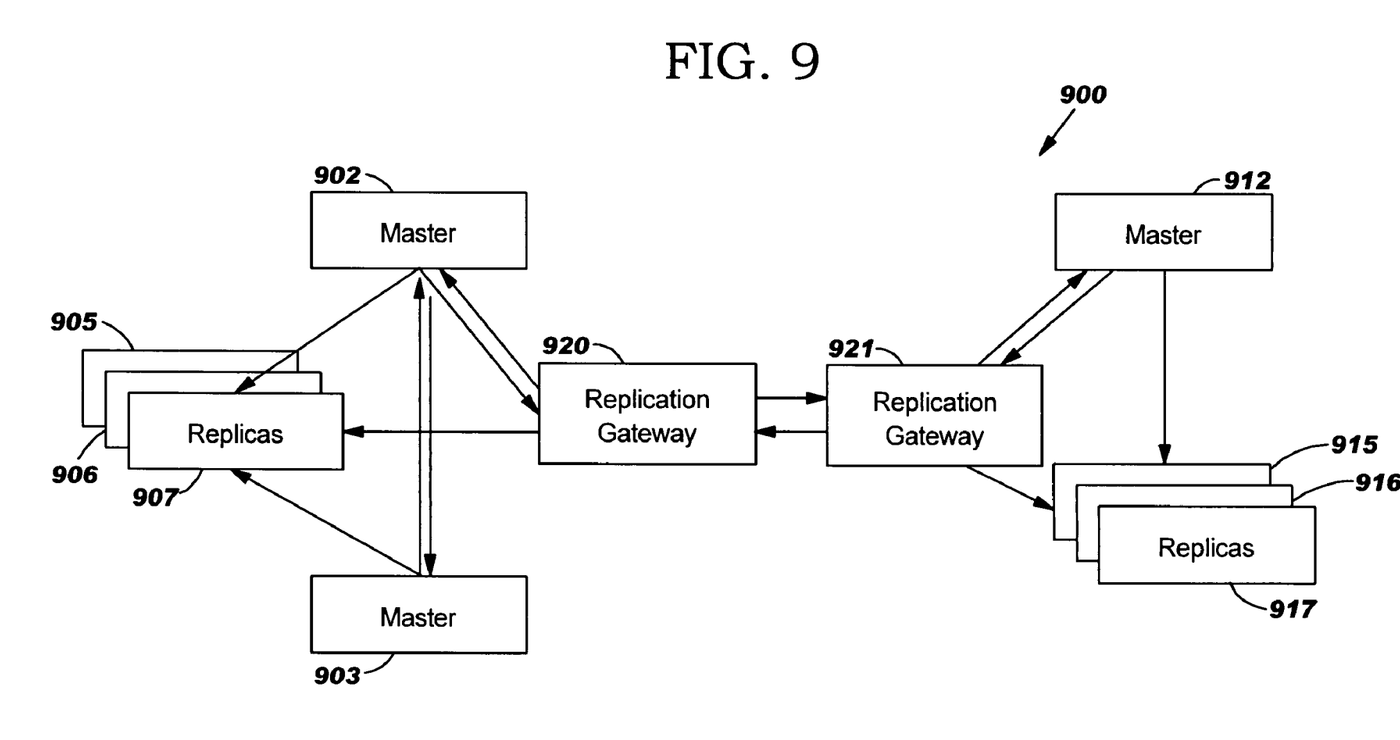
FIG. 9 shows another network featuring replication conflict resolution via gateways in accordance with embodiments of the present invention.

FIG. 9 shows another network configuration in which the replication routine may be implemented in accordance with embodiments of the present invention. Network 900 includes masters 902 and 903 and replicas 905-907. Additionally, master 912 interfaces with replicas 915-917. Replication between masters 902-903 and master 912 is performed via replication gateways 920 and 921. Other network topology variants may be suitably substituted as will be recognized by those skilled in the art, and embodiments of the invention may be applied to each variation with little, if any, change to the algorithm.

Thus, the present invention provides a technique for resolving a replication conflict in a multi-mastered data processing system. Replication conflicts between multiple data masters are resolved such that data convergence between multiple masters is ensured. Additionally, data that is replaced during a replication conflict resolution operation is preserved.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of resolving a conflict when performing data replication in a multi-mastered system, the method comprising the computer implemented steps of:

receiving, by a first data processing system, a replication command generated by a second data processing system;

identifying the conflict between a first entry managed by the first data processing system and a second entry managed by the second data processing system, wherein the conflict exists when a first update occurs to the first entry and a second update occurs to the second entry prior to the data replication in the multi-mastered system, wherein the replication command generated by the second data processing system includes the second update performed by the second data processing system on the second entry, a first timestamp read from the second entry prior to the second update and a second timestamp that identifies the time at which the second update was performed, wherein the step of identifying further includes:

comparing the first timestamp with a third timestamp, wherein the third timestamp is read from the first entry and identifies the time at which the first update was performed to the first entry; and determining that the first timestamp and the third timestamp are unequal;

responsive to identifying the conflict, determining a one of the first entry and the second entry that is a most recently modified entry using the first timestamp, the second timestamp and the third time-stamp, wherein the one of the first entry and the second entry not identified as the most recently modified entry is a least recently modified entry;

responsive to determining that the second entry is the most recently modified entry, replacing the first entry with the second entry to resolve the conflict when performing the data replication in the multi-mastered system, wherein the step of replacing the first entry with the second entry includes:

sending, by the first data processing system, a request for a refresh operation to the second data processing system; and responsive to receiving the request; returning, by the second data processing system, an insert command including the second entry to the first data processing system;

responsive to determining that the first entry is the most recently modified entry, replacing the second entry with the first entry to resolve the conflict, wherein the step of replacing the second entry with the first entry includes:

discarding, by the first data processing system, the second update; and sending, by the first data processing system, an insert command including the first entry to the second data processing system; and responsive to determining the most recently modified entry, logging the least recently modified entry in a record that defines the conflict that has been resolved, wherein the step of replacing and logging are performed by the first data processing system when it is determined that the second entry is the most recently modified entry; and are performed by the second data processing system when it is determined that the first entry is the most recently modified entry.

2. A computer program product in a computer recordable-type medium for resolving a conflict when performing data replication in a multi-mastered system, the computer program product comprising:

first instructions for receiving, by a first data processing system, a replication command generated by a second data processing system;

second instructions for identifying the conflict between a first entry managed by the first data processing system and a second entry managed by the second data processing system, wherein the conflict exists when a first update occurs to the first entry and a second update occurs to the second entry prior to the data replication in the multi-mastered system, wherein the replication command generated by the second data processing system includes the second update performed by the second data processing system on the second entry, a first timestamp read from the second entry prior to the second update and a second timestamp that identifies the time at which the second update was performed, wherein the second instructions further includes:

instructions for comparing the first timestamp with a third timestamp, wherein the third timestamp is read from the first entry and identifies the time at which the first update was performed to the first entry; and instructions for determining that the first timestamp and the third timestamp are unequal;

third instructions responsive to identifying the conflict, for determining a one of the first entry and the second entry that is a most recently modified entry using the first timestamp, the second time-stamp and the third timestamp, wherein the one of the first entry and the second entry not identified as the most recently modified entry is a least recently modified entry;

fourth instructions responsive to determining that the second entry is the most recently modified entry, for replacing the first entry with the second entry to resolve the conflict when performing the data replication in the multi-mastered system, wherein the fourth instructions includes:

instructions for sending, by the first data processing system, a request for a refresh operation to the second data processing system; and instructions responsive to receiving the request; for returning, by the second data processing system, an insert command including the second entry to the first data processing system;

fifth instructions responsive to determining that the first entry is the most recently modified entry, for replacing the second entry with the first entry to resolve the conflict, wherein the fifth instructions includes:

instructions for discarding, by the first data processing system, the second update; and instructions for sending, by the first data processing system, an insert command including the first entry to the second data processing system; and sixth instructions responsive to determining the most recently modified entry, for logging the least recently modified entry in a record that defines the conflict that has been resolved, wherein the replacing and logging are performed by the first data processing system when it is determined that the second entry is the most recently modified entry; and are performed by the second data processing system when it is determined that the first entry is the most recently modified entry.

* * * * *